United States Patent [19]

Hirs

[11] 3,992,291

[45] *Nov. 16, 1976

[54] METHOD OF FILTERING OIL FROM LIQUIDS

[75] Inventor: Gene Hirs, Birmingham, Mich.

[73] Assignee: Hydromation Filter Company, Livonia, Mich.

[ * ] Notice: The portion of the term of this patent subsequent to Dec. 25, 1990, has been disclaimed.

[22] Filed: Oct. 22, 1975

[21] Appl. No.: 624,611

Related U.S. Application Data

[63] Continuation-in-part of Ser. No. 575,104, May 6, 1975, abandoned, which is a continuation-in-part of Ser. No. 418,165, Nov. 21, 1973, abandoned, which is a continuation-in-part of Ser. No. 219,145, Jan. 19, 1972, Pat. No. 3,780,861.

[52] U.S. Cl. ............................. 210/23 R; 210/80; 210/DIG. 5; 210/82
[51] Int. Cl.² .......................................... B01D 23/24
[58] Field of Search ............. 51/303; 210/23 R, 32, 210/35, 39, 40, 80, 82, 274, 275, 500, DIG. 5, DIG. 21

[56] References Cited
UNITED STATES PATENTS

| | | | |
|---|---|---|---|
| 2,733,138 | 1/1956 | Clark | 51/303 |
| 3,478,873 | 11/1969 | McLean | 210/23 R |
| 3,478,874 | 11/1969 | McLean et al. | 210/23 R |
| 3,550,774 | 12/1970 | Hirs et al. | 210/80 X |
| 3,562,153 | 2/1971 | Tully et al. | 210/40 X |
| 3,574,096 | 4/1971 | Carlstedt | 210/23 R |
| 3,574,329 | 4/1971 | Beavon | 210/80 |
| 3,752,762 | 8/1973 | Cincotta | 210/32 |
| 3,780,861 | 12/1973 | Hirs | 210/80 |
| 3,853,753 | 12/1974 | Jones | 210/23 R |

*Primary Examiner*—Charles N. Hart
*Assistant Examiner*—Robert H. Spitzer
*Attorney, Agent, or Firm*—Cullen, Settle, Sloman & Cantor

[57] ABSTRACT

This disclosure relates to a method for filtering suspended oil contaminants from an aqueous-based liquid. The method includes flowing the contaminated liquid through a bed of granulated black walnut shells which have a relatively weak affinity for oil. The suspended oil is coalesced during flow through the filter bed to form globular oil particles that are large enough to become entrapped in the interstices of the filter bed. After a substantial quantity of oil has been accumulated in the filter bed, the bed is rejuvenated by flowing backwash liquid therethrough to provide a high velocity scrubbing to free at least a portion of the accumulated oil from the bed, the shells' weak affinity for oil facilitating such rejuvenation. Next, the bed is reformed and a subsequent filtration cycle is initiated.

9 Claims, No Drawings

METHOD OF FILTERING OIL FROM LIQUIDS

CROSS-REFERENCE TO RELATED APPLICATIONS

This application is a continuation-in-part of Ser. No. 575,104, filed May 6, 1975, now abandoned which is a continuation-in-part of Ser. No. 418,165, filed Nov. 21, 1973, and now abandoned, which is a continuation-in-part of application Ser. No. 219,145, filed Jan. 19, 1972, entitled "GRANULAR FILTER MEDIUM," now U.S. Pat. No. 3,780,861, issued Dec. 25, 1973.

BACKGROUND OF THE INVENTION

Applicant has earlier proposed in his United States Letters Patents Nos. 3,557,955 and 3,550,774 (herein incorporated by reference) a new and novel type of "deep bed" filter wherein synthetic polymeric materials in finely granulated form are utilized as the filter media.

The utilization of synthetic polymeric materials, such as polyvinyl chloride (PVC) materials, was preferred because of the combination of the necessary physical characteristics of such materials. For example, the method and apparatus disclosed in U.S. Pat. No. 3,550,774 cleanses the filter medium by placing a mixture of medium and earlier removed contaminants in a slurry and then subjecting this slurry to a violent washing action, i.e., flowing the slurry past a perforate scrubbing element. Any practical filter medium for utilization in such a method must be light (preferably having a specific gravity of 1.55 or less), strong (having a modulus of elasticity of 40,000 PSI or greater) and non-abrasive (so as not to wear away the perforate scrubbing element).

These requirements of the filter medium eliminates from consideration the common granular filter media, such as sand, anthracite, and activated carbon. Many other materials, particularly synthetic polymeric materials are eliminated because of their high cost.

A separate and distinct problem in the art of filtration or liquid separation is the removal of oily industrial wastes from a water or non-water mixture. For example, oily wastes are typically removed from industrial plant discharges by the use of chemicals, gravity settling and other conventional techniques. These methods, however, are generally incapable of reducing the oil content in discharge liquids to below about 150 ppm. To achieve better clarity, large clarifiers are required, and even then, it is somewhat difficult to consistently achieve an extremely clean liquid having an oil content lower than about 30 ppm.

A further method of separating oil comtaminants from a water based solution is disclosed in U.S. Pat. No. 3,526,153 to Tully. This patent suggests treating certain oil-absorbent materials with colloidal hydrophobic metal or metalloid oxides to thereby form an improved oil-absorbent composition. Within the long list of examples of possible oil-absorbent materials, this patent includes a broad suggestion of treated "nut shells," wherein the coating is relied upon to attract the oil. This patent disclosure fails in several material respects, including a suggestion for rejuventating and reusing the filter media.

Applicant has found that a very specific "nut shell," i.e., granulated black walnut shells, possesses a capability of coalescing oil during contaminant liquid flow and accumulating the coalesced oil in the interstices of the filter media bed. Black walnut shells also exhibit a relatively weak affinity for oil enabling rejuvenation of the bed by conventional backwash cycles. The economic benefits flowing from the present invention will be apparent to one skilled in the art of filtration or liquid separation, in view of: (1) the commercial availability of black walnut shells; (2) the monetary savings from the elimination of medium treatment; (3) the relative ease of removing the accumulated oil from the medium; and (4) the ability to reuse the filter media.

Accordingly, many natural materials have been investigated for (1) their strength to withstand the slurrying and violent cleansing action when employed in combination with the scrubber tube of U.S. Pat. No. 3,550,774; and (2) their affinity for attracting and accumulating oils suspended in an emulstion, and then for releasing the accumulated oils during rejuvenation of the filter bed.

SUMMARY OF THE INVENTION

This invention relates to a method of removing suspended oil particles from an immiscible mixture of oil and an aqueous based liquid. More specifically, it has been found that granular shells of walnut (Juglans nigra L.) posses a unique combination of properties which make them fully acceptable as a filter medium; (1) for utilization in the method and apparatus disclosed in Applicant's prior U.S. Pat. Nos. 3,550,774 and 3,557,955 or in similar apparatus or methods where a light, strong and not too abrasive or brittle filter medium is necessary; and (2) for utilization in removing suspended oils from an oil-liquid mixture.

Granulated black walnut shells have exhibited a unique suitability for filtering suspended oil from a water-based liquid, even though this filter material has a relatively weak affinity for oil. The black walnut shell filter media serves to coalesce fine oil particles during fitration liquid flow to form larger oil globule particulates that are then trapped within the interstices of the media bed. The shells' relatively weak affinity for oil then facilitates rejuvenation of the filter bed by various desired backwashing techniques, including a high velocity liquidous scrubbing. Alternatively, the bed may be regenerated by the methods and apparatus of Applicant's prior U.S. Pat. No. 3,550,774.

It can therefore be appreciated that the present invention provides a reusable filter media bed for use in the method of removing oil from water.

OBJECTS

It is therefore, an important object of the present invention to provide a filter medium consisting essentially of a bed of granulated shells of black walnuts.

Another important object of the present invention is a method of filtering solid or oil contaminant particles from a liquid by passing the contaminated liquid through a bed of granulated shells of black walnuts.

Yet another, and no less important, object of the present invention is the method of filtering contaminant particles from a liquid by passing the liquid through a bed of granulated shells of black walnuts, and cleansing the contaminated particles from the bed by violently slurrying the bed and the particles and passing the slurry past a perforate separating element through which a part of the slurry containing contaminant particles is withdrawn.

A further object, and one highly important to the subject matter of this continuation-in-part application, is the provision of a method of filtering suspended oils from a liquid by passing the oil-contaminated liquid through a bed of granulated shells of black walnuts.

Yet another important object of this continuation-in-part application is the method of filtering suspended oil particles from a liquid by passing the liquid through a bed of granulated shells of black walnuts to coalesce and capture the oil particles, and then cleansing the bed of accumulated oils by a backwash liquid flow.

DETAILED DESCRIPTION OF THE INVENTION

As explained above, the present invention proposes a filter medium for (1) utilization in the apparatus and methods set forth in Applicant's earlier U.S. Pat. Nos. 3,550,774 and 3,557,955; and (2) economical and efficient removal of suspended oils from an oil-contaminated liquid. To utilize the filter bed in the first disclosed inventive concept, granulated shells of black walnut (Juglans nigra L.) are simply substituted for the synthetic polymeric materials disclosed in said earlier patents. The apparatus and methods of operating the disclosed apparatus remain the same as disclosed in said earlier patents. To utilize the filter bed in the second disclosed inventive concept, granulated shells of black walnut are employed in any conventional filter or oil separation apparatus, for example, a filter apparatus of the conventional deepbed type, through which an oil contaminated liquid is circulated.

The unique properties of the granulated shells of black walnut enable this material to be employed in the various inventive concepts disclosed herein, and the shells are preferably utilized in size ranging from about 20 to 60 U.S. Sieve mesh. In the practice of the oil separation method, the most preferred shell size is between about 20 and 30 mesh.

The particular characteristics which enable the shells to be employed in the first inventive concept are as follows: the black walnut shells are light in weight, with a specific gravity of about 1.3 to 1.4; the shells are relatively strong, having a modulus of elasticity of 170,000 psi; and the shells are relatively non-abrasive when compared to sand or anthracite coal. This last property is somewhat surprising in view of the common use of walnut shells as a blasting grit for metal finishing. However, black walnut shells are utilized as "soft grit" which does not cause pitting of the metal part to be cleaned.

To illustrate the utilization of granular black walnut shells as a filter medium for removing solid particulate contaminants, the following table is presented. In obtaining the figures of this table, liquid containing a standard test dirt consisting of $Fe_3O_4$ in the indicated amount was passed through 12 inches of 20 to 50 mesh granular black walnut shells. The dirt was added at a rate of 250 mg/liter. The filter flow rate was 10 gallons/minute/square foot of cross-sectional area of the shells. The following results were obtained:

| Gallons of filtered liquid | Pounds of dirt added per cubic foot of media | Filter effluent clarity mg/l |
|---|---|---|
| 20 | 0.5 | 0.24 |
| 40 | 1.0 | 0.36 |
| 60 | 1.5 | 3.2 |
| 80 | 2.0 | 9.9 |
| 100 | 2.5 | 14.5 |

Generally speaking, the above table illustrates that granular black walnut shells have a dirt holding capacity which is substantially equivalent to that of silica sand.

Other favorable characteristics of black walnut shells when utilized as a filter medium for solid particulate contaminants are: (1) they are oil and water resistant, i.e., they do not deteriorate over extended periods of use; (2) they have a hardness of MOH's of 3; and (3) for all practical purposes they are chemically inert. Also granular black walnut shells are commercially available in all practical mesh sizes for use in deep-bed filtration at a cost which is about one-sixth the cost of many inexpensive plastic materials.

The unique properties of granulated black walnut shells for use as a medium in removing suspended oils from an oil contaminated liquid relate not only to the above-mentioned characteristics but also their ability to accumulate and hold contaminant oil to generate a clarified liquid and then release the accumulated oils during a conventional backwash cycle. It is believed that the bed of granulated black walnut shells serves to coalesce the fine suspended oil particulates or globules to form larger particulates which are captured or entrapped in the interstices of the filter bed. The shells' relatively weak oil affinity then facilitates rejuvenation of the filter media bed by a variety of backwashing techniques, as will be discussed in greater detail below.

The present method may be used to clarify liquids that are contaminated with only oil or with oil and solids. In the latter situation, this invention is directed to the filtration of oil contaminants independently of any solid contaminants, i.e., the filtration of suspended oil in excess of that sufficient to surface wet any solid contaminants present, since any oil which surface wets solid contaminants will be accumulated in the filter bed as an adherent to the solid.

It may also be desirable to add slight amounts of coagulating agents such as filter alum, to the contaminated liquid prior to flow through the filter bed to enhance the coalescing of the oil particles.

A measure for a material's affinity for oil may be expressed in terms of an "oil affinity quotient". This term is explained by reference to the following testing which was conducted to evaluate the relative oil affinity of PVC, anthracite, sand, and black walnut shells. Four separate tests were conducted, each substantially according to the same testing techniques. The results of these tests are set forth below in four separate columns. A final column includes averages of the four tests, those averages representing an "oil affinity quotient" for definitional purposes of this invention.

Testing to compare the oil affinity quotient of granulated black walnut shells to that of other materials included separately sieving quantities of PVC, anthracite, sand and black walnut shells to obtain the same particle size. The sieved materials passed a standard 20 mesh screen and were retained on a standard 30 mesh screen. Next, a 25 cubic centimeter volume of each media was weighed and then soaked in light mineral oil, i.e., kerosene, for fifteen minutes. Subsequently, the oil and soaked media were vacuum filtered by pulling air through the media at ten inches of mercury for five minutes after the oil had been evacuated. The oily medias were then reweighed to calculate the oil affinity quotient, which is expressed in terms of oil retention per unit volume of media. The following table sets forth the results which were obtained.

| MEDIA | Test 1 | Test 2 | Test 3 | Test 4 | Oil Affinity Quotient Average |
|---|---|---|---|---|---|
| | (Grams of oil retained per cubic centimeter of media) | | | | |
| PVC | .192 | .240 | .244 | .172 | .212 |
| Anthracite | .032 | .044 | .052 | .040 | .042 |
| Sand | .032 | .048 | .052 | .040 | .043 |
| Walnut Shells | .020 | .044 | .036 | .032 | .033 |

In general, the results vary from test to test. However, the overall comparison of relative oil affinities stays about the same. Test 2 is an aberration to the general comparative results, but was included for full disclosure purposes and for use in obtaining an average of all testing so that the oil affinity quotients could be determined.

The results show that black walnut shells have an oil affinity quotient of only about 16% of that for PVC. This explains the difficulty in removing contaminant oil from PVC medium.

The results also show that black walnut shells have an oil affinity of only about 75% of the oil affinity of sand and anthracite. This difference seems to be significant in the removal of oily contaminants from the filter media. Further, sand and anthracite have the following disadvantages. Sand is relatively heavy and abrasive; it is therefore not a suitable media for use in the methods of filter media regeneration of U.S. Pat. No. 3,550,774. Anthracite is easily fractured into relatively flat flaky particles, which blind off prematurely, as more fully discussed in Applicant's U.S. Pat. No. 3,900,395.

The manner of removing the accumulated oil contaminants from a bed of granulated black walnut shells will depend upon various characteristics of the particular oily contaminants being filtered and the filtration techniques. For example, if the filter bed is rejuvenated only infrequently after the filter bed has become totally saturated, the filter bed may require violent agitation to break up the agglomerated mass of filter granules and accumulated oil. This could include slurrying the filter media and accumulated contaminants, and flowing the slurry exterior to the filter housing through a flow line to free the accumulated oil from filter granules. Then the slurry could be returned through the flow line back to the filter housing, where the bed could be reformed and then backwashed in a conventional manner. If this particular rejuvenation technique is used, the physical characteristics set forth earlier are important, i.e., lightness, strong modulus of elasticity and non-abrasiveness.

If the filter bed is rejuvenated frequently, less violent agitation may suffice; reverse backwashing may be all that is required.

Such rejuvenation techniques may also be a function of black walnut granule size. Ideally, the oil will be removed through a simple backwash cycle including introduction of fluid flow through the media bed in a reverse direction to normal filtration flow. However, it may be desirable to turbulently agitate the media bed during the backwash cycle, for example, by introducing scouring air into the bed. As a further modification, it may be found desirable to form a slurry of the bed of granulated black walnut shells and flow the slurry over a perforated element, as disclosed in Applicant's U.S. Pat. No. 3,550,774.

All these disclosed backwashing techniques will provide the desired media rejuvenation, i.e., a high velocity liquidous scrubbing to free at least a portion of the captured oily contaminants from the bed.

Having fully and particularly described my invention, I now Claim:

1. A method of removing oily particulate contaminants from contaminated water-based liquid independently of any solid contaminants, comprising the steps of:
   flowing oil-contaminated liquid through a deep bed filter of granulated black walnut shells;
   coalescing at least a portion of the oily particulates during flow through the deep bed to form larger particles consisting essentially of oil, and capturing the coalesced oil particles in the interstices of the black walnut shell filter bed;
   terminating contaminated liquid flow after the filter bed has become at least partially saturated by captured oil contaminants;
   backwashing the mixture of granulated black walnut shells and contaminants by a high velocity liquidous scrubbing to free at least a portion of the captured oily contaminants to rejuvenate the bed; and
   reinitiating oil-contaminated liquid flow through the bed of granulated black walnut shells.

2. The method of filtering contaminants consisting essentially of oil particulates from a liquid, comprising the steps of:
   flowing the contaminated liquid through a filter bed of granulated shells of black walnuts (Juglans Nigra L.) to coalesce the oil particulates and accumulate the coalesced oil in the interstices of the filter bed;
   terminating the flow of contaminated liquid after at least a portion of the contaminants have been retained in said filter bed; and
   cleansing said filter bed by violently and turbulently backwashing at least a part of said filter bed having contaminants therein over a perforated element, and withdrawing at least a portion of said contaminants through said perforate element.

3. In a method of filtering, the steps of flowing liquid contaminated with freely suspended oil globules through a filter medium bed of granulated shells of black walnuts (Juglans nigra L.), coalescing at least a portion of the oil globules to form agglomerations consisting essentially of oil, and accumulating at least a portion of the oil agglomerations in the interstices of the filter bed;
   terminating the liquid flow through the filter medium bed;
   flowing backwash liquid upwardly through the bed (a) to expand the bed and (b) to remove accumulated contaminants from the filter bed, said black walnut shells having a relatively weak affinity for oil which facilitates the removal of the accumulated contaminant during the backwash liquid flow;
   terminating the backwash liquid flow; and
   reinitiating filtration liquid flow through the filter medium bed.

4. In a method of removing oily contaminants from a contaminated water-based liquid, the steps of:
   flowing liquid contaminated with freely suspended oil particles in excess of that sufficient to surface wet any solid contaminants which might be present through a filter bed of granulated black walnut shells (Juglans nigra L.) within a filter housing;

coalescing oil particles during the contaminted liquid flow through the filter bed and independently accumulating coalesced oil contaminants in the interstices of the filter bed during the flow of liquid therethrough, to achieve a clarified effluent;

terminating the flow of contaminated liquid after the filter bed has become at least partially saturated with accumulated contaminants;

cleaning the filter bed of granulated black walnut shells by (a) injecting diluent liquid into said bed to form a liquidous mixture including filter granules and contaminants; (b) violently agitating the liquidous mixture to dislodge the accumulated contaminants from the filter bed granules; and (c) removing contaminants from the filter bed; and reforming the filter bed of granulated walnut shells for further filtration flow.

5. The method as defined in claim 4, wherein the cleaning step is further characterized by flowing the liquidous mixture through a flow path which is in part exterior to the filter housing, and withdrawing part of the diluent liquid and contaminants from the liquidous mixture flow through a perforated surface in said flow path.

6. The method as defined in claim 4, wherein the step of cleaning is further characterized by flowing the agitated liquidous mixture over a perforated element, and withdrawing at least a portion of the diluent liquid and contaminants through said perforate element.

7. In a method of removing suspended globular oil particles from an aqueous-based liquid, the steps of:

flowing the oil-contaminated liquid through a filter media bed consisting essentially of untreated granular black walnut shells;

coalescing at least some of the globular oil particles during the liquid flow through the granulated black walnut shells to form larger particles consisting essentially of oil and capable of being entrapped within the interstices of the filter media bed;

accumulating at least a portion of the coalesced oil particles in the filter media bed to achieve a clarified liquid effluent;

terminating the oil-contaminated liquid flow after the granular black walnut shells have become at least partially contaminated with oil;

flowing a backwash liquid through said bed to remove at least part of the accumulated oil to rejuvenate the bed for further oil separation flow;

terminating said backwash flow; and reinitiating oil-contaminanted liquid flow through the bed of granular black walnut shells.

8. A method for separating oil from an aqueous-based liquid, comprising the steps of:

1. flowing an immiscible mixture consisting essentially of oil and an aqueous-based liquid through a bed of granulated black walnut shells and coalescing oil as it flows through the filter bed;

2. removing at least some of the oil from said mixture during Step (1) by the accumulation of coalesced oil in the intersticies in the filter bed;

3. terminating flow of the mixture after said black walnut shells have become at least partially contaminated with oil;

4. flowing backwash liquid into and through the bed of granulated black walnut shells;

5. removing at least part of the accumulated oil during Step (4) to regenerate said bed for further oil-separation flow;

6. terminating the backwash liquid flow; and 7. reinitiating flow of an immiscible mixture consisting essentially of oil and an aqueous-based liquid through the bed of granulated black walnut shells.

9. In a method of removing contaminant oil particles from a water-based liquid, including the steps of flowing said liquid though a reusable filter media bed of granulated black walnut shells, terminating said flow after the bed has become at least partially contaminated, regenerating the bed, and reusing the bed for subsequent filtration cycles, wherein the improvement comprises:

during liquid flow through the layer (a) coalescing at least a portion of the contaminant oil particles to form larger particles consisting essentially of oil, and (b) accumulating at least a portion of the coalesced oil particles in the interstices of the filter media beds; and regenerating the shells by introducing a backwash liquid into and through said layer to remove at least a portion of the accumulated oil, the black walnut shells having a relatively weak affinity for oil, facilitating regeneration of the bed.

* * * * *